(No Model.)
W. BARKER.
CHECK VALVE.
No. 314,216. Patented Mar. 24, 1885.
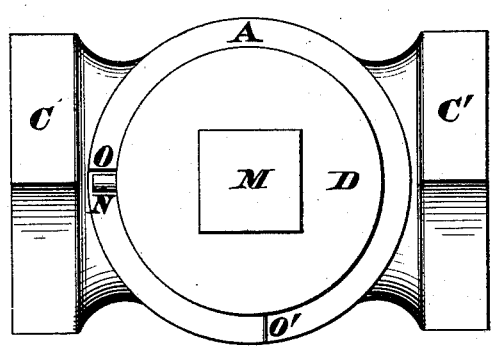
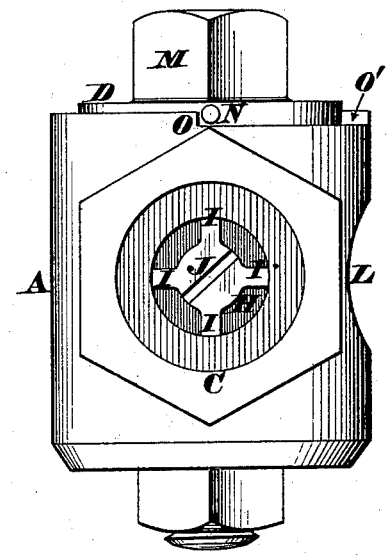
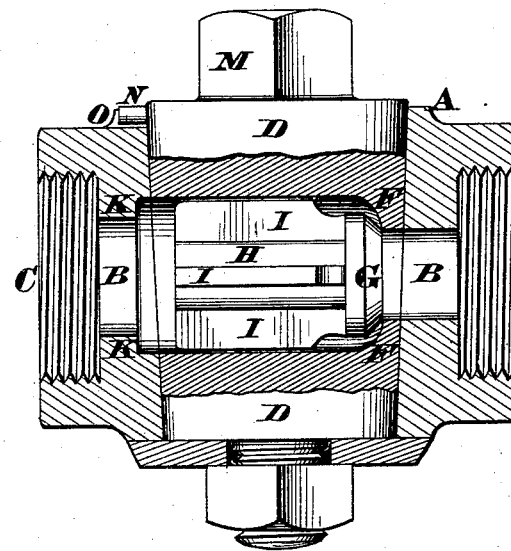
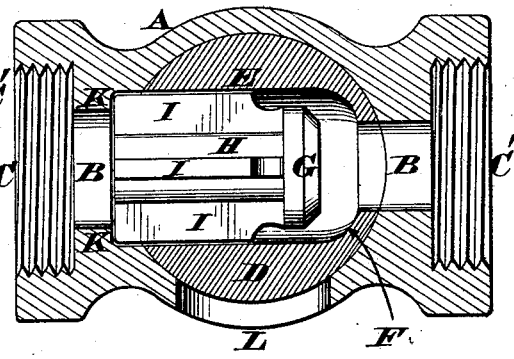
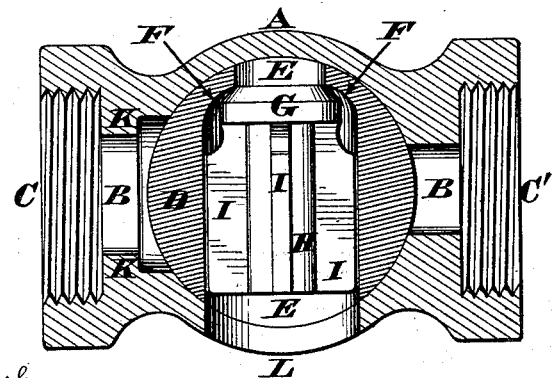
Attest.
S. S. Carpenter
Frank Marsh
Inventor.
William Barker
by James H. Layman
Atty.

UNITED STATES PATENT OFFICE.

WILLIAM BARKER, OF CINCINNATI, OHIO.

CHECK-VALVE.

SPECIFICATION forming part of Letters Patent No. 314,216, dated March 24, 1885.

Application filed October 15, 1884. (No model.)

*To all whom it may concern:*

Be it known that I, WILLIAM BARKER, a citizen of the United States, residing at Cincinnati, in the county of Hamilton and State of Ohio, have invented certain new and useful Improvements in Check-Valves, of which the following is a specification, reference being had therein to the accompanying drawings.

The object of my invention is to enable the regrinding of check-valves without removing them bodily from the pipes through which water or any other fluid is forced into boilers or other receptacles, and I accomplish this result in the following manner: The shell or casing of the device has a rotating plug or disk fitted in it, which plug has a passage or port that is normally in line with the axial channel of the tube or pipe or other conduit traversed by the water or other fluid, said port or passage having at one end a seat for the check-valve; but when this plug is turned about one-fourth around the port or passage is disposed at right angles to the channel of the pipe or tube, thereby shutting off the feed and bringing the stem of the valve directly opposite a suitable opening in the side of the shell or casing. Any convenient implement can then be inserted in this opening and engaged with the stem, so as to regrind the valve in the most expeditious and thorough manner, as hereinafter more fully described.

In the annexed drawings, Figure 1 is a plan of my improved check-valve, the plug of the same being set to allow a free passage of water. Fig. 2 is an axial section of the device, the check-valve being shown closed against the seat in the plug. Fig. 3 is an end elevation of the device. Fig. 4 is a horizontal section thereof, the valve being retracted from its seat. Fig. 5 is another horizontal section, but showing the plug turned one-fourth around, so as to stop the flow of water and allow the valve to be reground.

The shell or casing A of the device has an axial channel, B, and a pair of customary screw-threaded sockets, C C', to which latter the pipes, tubes, or other conduits are coupled in the usual manner. Fitted within this shell or casing is a plug, D, which may be disposed either vertically or horizontally, as may be most convenient, said plug being provided with a transverse port, E, that is reduced in diameter at one end, thereby forming a seat, F, for the reciprocating valve G, the latter being furnished with an axial stem, H, armed with radial wings I, whereby said valve is centralized within said port. A slot, groove, or nick, J, is made in the end of this stem to receive a screw-driver or other implement wherewith the valve may be readily manipulated when it is to be reground; or the same result may be accomplished by causing a forked tool to grasp the stem H between either of its wings I.

K is an annular counterbore in the channel B of shell A, which counterbore serves as a stop or shoulder that limits the retraction of the valve G H I, as seen in Fig. 4.

L is an opening in the side of the shell A, which opening is practically of the same diameter as the port E.

M is a "square," wherewith the plug D can be properly turned within the shell A, the movement of said plug in either direction being limited by its pin N coming in contact with one of the stops O or O' of said shell.

When the device is in its normal or operative condition, the plug D is turned so as to cause its pin N to come in contact with the stop O, by which means the port E of said plug is in line with the channel B of the shell, as seen in Figs. 2 and 4. As soon as the pump or other device that forces the fluid is set in operation, the valve G reciprocates within the port E, being driven away from the seat F to admit the inflowing current, as seen in Fig. 4, and closing against said seat to prevent any return of the fluid, as represented in Fig. 2. Furthermore, reference to Fig. 4 shows that the valve G is limited in its retracted movement by the ends of the various radial wings I coming in contact with the annular stop, shoulder, or counterbore K of the channel B. Consequently said valve cannot open too far to permit its prompt closure at the proper moment. Furthermore, Fig. 4 shows that when the port E is in line with the channel B one side of plug D closes the opening L, and thereby prevents any escape of water or other fluid through said opening.

Preparatory to regrinding or inspecting the valve, the pump or other device employed in forcing the fluid is temporarily stopped, and plug D is turned around until its pin N comes in contact with the other shoulder or stop, O', which act brings the larger end of port E in line with the opening L of the shell A, as seen in Fig. 5. The valve is now withdrawn through said opening, a proper abradent applied, and said valve, being reinserted, is at once reground to its seat, during which operation water cannot escape from the boiler or other receptacle, because the axial channel B of the shell A is effectually closed by the plug D. After the regrinding is completed the plug is turned back to its normal position, and the valve then operates as previously described the moment the pump is again set in action.

It is evident this construction of device allows a new valve to be inserted as readily as an old one can be reground, and without causing any discharge of hot water or steam from the pipe to which the valve is applied.

I claim as my invention—

1. The combination, in a check-valve, of a casing or shell having a suitable passage and an opening at one side, and a rotating plug having a seated port containing a valve that closes against said seat, for the purpose described.

2. The combination, in a check-valve, of the pierced shell A B L, having a counterbore, K, and a rotating plug, D, having a seated port, E F, that contains a suitable valve, as G, closing against said seat, for the purpose described.

3. A check-valve having a turning member provided with a valved port, which port is normally in line with the channel of the valve casing or shell, but can be shifted out of line with said channel and brought into communication with an opening in said casing, in order that said valve may be reground without removing it bodily, substantially as herein described.

In testimony whereof I affix my signature in presence of two witnesses.

WILLIAM BARKER.

Witnesses:
JAMES H. LAYMAN,
SAML. S. CARPENTER.